Jan. 1, 1924. 1,479,149
D. MATTEI ET AL
APPARATUS FOR THE MANUFACTURE OF WELDLESS TUBES FROM FIBROUS
MATERIALS AND HYDRAULIC CEMENT SUBSTANCES
Filed July 8, 1920 3 Sheets-Sheet 1

Inventors
D. Mattei & A. Mazza
By H. R. Kerelake Atty

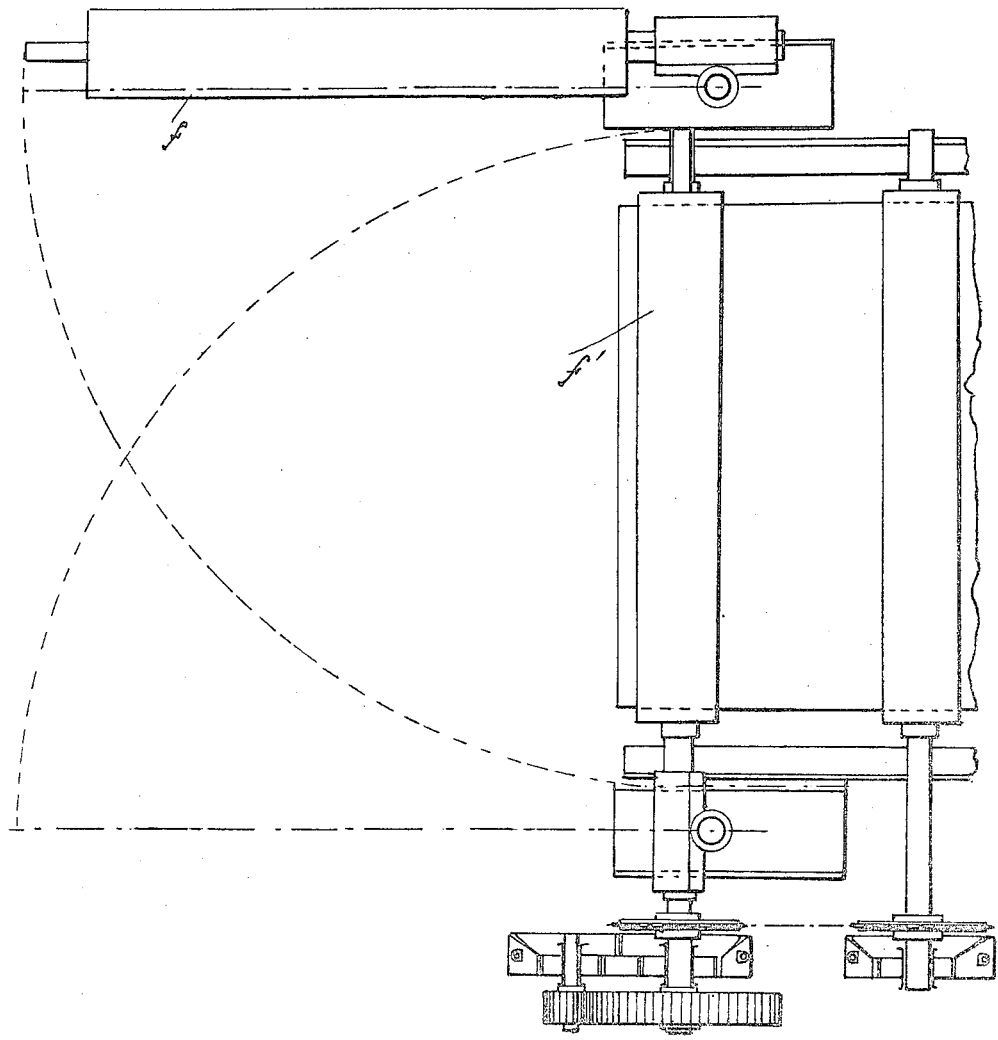

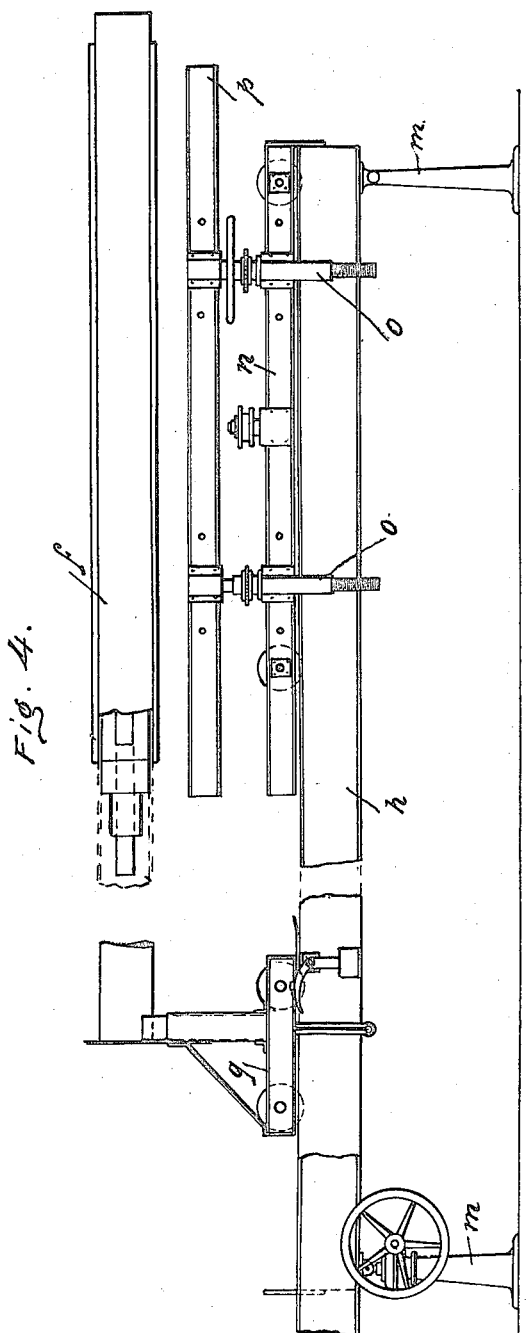

Patented Jan. 1, 1924.

1,479,149

UNITED STATES PATENT OFFICE.

DIEGO MATTEI AND ADOLFO MAZZA, OF GENOA, ITALY.

APPARATUS FOR THE MANUFACTURE OF WELDLESS TUBES FROM FIBROUS MATERIALS AND HYDRAULIC CEMENT SUBSTANCES.

Application filed July 8, 1920. Serial No. 394,814.

(GRANTED UNDER THE PROVISIONS OF THE ACT OF MARCH 3, 1921, 41 STAT. L., 1313.)

*To all whom it may concern:*

Be it known that we, DIEGO MATTEI, mechanical engineer, and ADOLFO MAZZA, mechanical engineer, both subjects of the King of Italy, and resident of 3 Via Caffaro, Genoa, in the Kingdom of Italy, have invented certain new and useful Improvements in Apparatus for the Manufacture of Weldless Tubes from Fibrous Materials and Hydraulic Cement Substances, of which the following is a specification.

The present invention relates to a machine for the manufacture of weldless tubes consisting of fibrous materials and hydraulic cement substances by means of the same paper machine, suitably modified, which is employed to make slabs of artificial slate, the constituents of the latter being the same as for the tubes.

In the manufacture of artificial slate slabs the mixture settling in successive layers on the collecting mandrel is cut, when it attains a predetermined thickness, along several longitudinal grooves formed in the direction of the generating line of the mandrel and is then removed so as to obtain the slabs, whereas in the improved tube manufacturing process the mixture is left on the mandrel until it reaches the desired thickness, thus allowing the formation of a tube whose length and diameter depend solely upon length and diameter of the mandrel.

In order to facilitate the removal of the tube from the mandrel complex devices must be used which form the subject matter of the present invention.

After a long series of experiments it has been ascertained that if the tube ends are carefully cut away from the mandrel by means of the usual wooden knife, the tube's physical adhesion to the cylinder immediately ceases.

It has also been ascertained that if after the said cutting of the ends the mandrel continues to revolve, the tube undergoes a slow increase in diameter. If therefore at the right moment, that is to say before the tube has attained the desired thickness, the tube ends are cut and the mandrel is permitted to revolve for a few turns more so as to subject the tube to a kind of rolling process, the result will be that the tube not only will lose all adherence to the mandrel but will increase in diameter by a few millimeters thus facilitating its removal.

When removing the tube care should be had to thread a metal tube of corresponding diameter into it as the tube is being extracted, so that on completion of the extraction it be supported by the metal tube throughout its length, the sole object of this caution being to prevent deformation. To better ensure good results of this operation it will be advisable not to carry out the removal by hand, but with the help of an apparatus hereinafter called "cradle" permitting of the tube being slightly raised and then threaded out of the mandrel.

After extraction the tube will rest in the cradle, with the metal tube or core inside, that is to say it will be in good condition for transport.

Of course it is absolutely necessary that the mandrel diameter be such that the tube's final diameter, after the slight increase due to the abovesaid rolling action, shall be exactly the predetermined one.

The removal of the tube according to the method just described is facilitated by the following special arrangement which has been suggested by practice after numerous experiments.

The mandrel is so arranged that one of its ends remains free and the other is overhanging on a hinged support adapted to carry the tube and permitting of the mandrel being placed in the machine in the position required when the tube is being formed, and of its being altered to the extracting position (which is at right angles to the former position) in order to permit of a ready removal of the tube.

In order to shorten as much as possible the time during which the machine must remain idle, since the machine must necessarily be stopped when the mandrel passes from the working position to the tube extracting position, a second mandrel symmetrically arranged on the other side of the machine, is provided. Work is started with the second mandrel as soon as the first cylinder passes from the working to the tube extracting position, so that the tube manufacture proceeds on the two mandrels alternately and the interruptions of the work are immaterial.

The removal of the tube from the mandrel can be effected also by other methods which, however, have proved less convenient in practice than the method described above.

The annexed drawings show an improved embodiment of the invention.

Fig. 2 is a plan of the machine shown in Fig. 1.

Fig. 4 shows the cradle frame for the removal of the finished tube or pipe.

Figure 1:
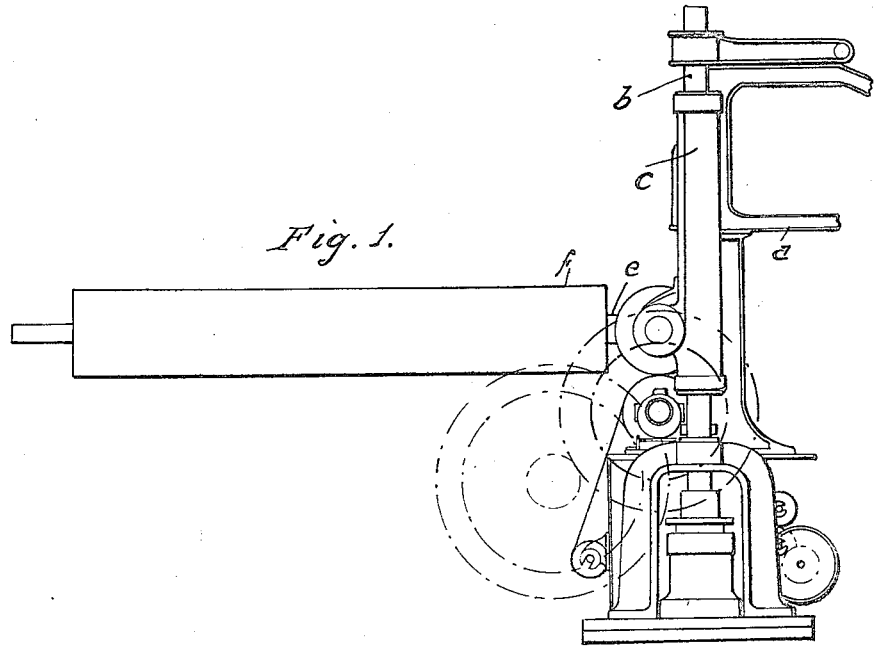
Fig. 1 is an end view of the paper machine having a pair of cylinders overhung mounted on an oscillating supporting arm.
Figure 3:
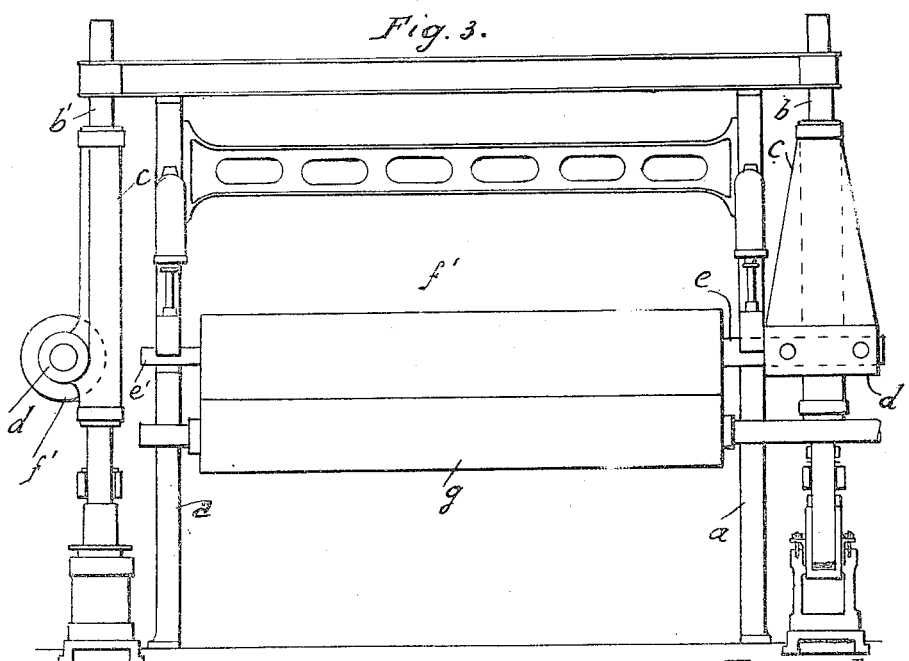
Fig. 3 is a side view of the machine.

$a$ is the end portion of the frame of the paper machine on the sides of which two pillars $b$, $b'$ are arranged; on these pillars two supporting tubes $c$, $c$ are carried rotatably about their axes, said tubes being provided with sleeves $d$ of a sufficient length to carry overhung shafts $e$ about which the forming mandrels $f$ and $f'$ can rotate.

One of the mandrels $f$ or $f'$ in turn can be held above the stationary cylinder $g$, by introducing the end $e'$ into the corresponding bearing fitted on the frame $a$, whilst the other mandrel $f'$ or $f$ is held in the proper position for extracting the tube therefrom, said portion being at right angles to the operative position of the other cylinder and of the stationary mandrel $g$.

As soon as the tube formed owing to the fibrous material and cement being deposited on the operating mandrel has attained the desired thickness, it is separated at its ends from the supporting mandrel and is subjected to calendering to have it detached from the supporting mandrel; thereupon the supporting mandrel with the tube threaded thereon is swung to the extracting position (Fig. 2) where it comes to a position above a cradle frame (Fig. 4) consisting of a frame of beams or rails $h$, suitably carried by means of standards $m$; a car $n$ is slidably arranged on these rails, said car serving as a carrier for a cradle $p$ of convenient cross section which receives the finished tube. The height of this cradle can be adjusted by means of set screws, whereby it bears on the car $n$.

Another car $q$ can be brought towards or away from the cradle $p$, by sliding it on rails $h$; this cradle $q$ carries the metal sheet core —$s$— on which the finished tube is threaded in moist condition, when the tube raised by the cradle and unthreaded from the supporting mandrel —$f$—, leaves this latter.

Having now particularly described and ascertained the nature of the said invention and in what manner the same is to be performed, we declare that what we claim is:

1. A machine of the character described comprising two supporting mandrels, and means rotatably supporting said mandrels for swinging movement about different axes, whereby the mandrels may be alternately moved to operative position.

2. A machine of the character described comprising two supporting mandrels, a stationary cylinder, and means rotatably supporting said mandrels for swinging movement about different axes whereby the mandrels may be alternately moved to operative position relative to the stationary cylinder.

3. A machine of the character described comprising alternately operable mandrels, and means pivotally supporting the respective mandrels for swinging movement about vertical axes located adjacent their opposite extremities whereby the mandrels may be alternately moved to operative position.

Signed at Genoa (Italy), this 10th day of June, 1920.

DIEGO MATTEI.
ADOLFO MAZZA.

Witnesses:
WILLIAM P. SHOCKLEY,
FRED N. SMITH.